(12) United States Patent
Abe et al.

(10) Patent No.: US 8,026,962 B2
(45) Date of Patent: Sep. 27, 2011

(54) IMAGE SYNTHESIZING APPARATUS AND IMAGE PICKUP APPARATUS WITH A BRIGHTNESS ADJUSTING PROCESSING

(75) Inventors: Yoshito Abe, Yokohama (JP); Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 363 days.

(21) Appl. No.: 12/397,726

(22) Filed: Mar. 4, 2009

(65) Prior Publication Data

US 2009/0225201 A1    Sep. 10, 2009

(30) Foreign Application Priority Data

Mar. 5, 2008    (JP) .................. 2008-055289

(51) Int. Cl.
*H04N 5/217*    (2011.01)
(52) U.S. Cl. ...................................... 348/241
(58) Field of Classification Search ................. 348/241; 382/255, 274, 284
See application file for complete search history.

(56) References Cited

U.S. PATENT DOCUMENTS

| | | | |
|---|---|---|---|
| 5,838,837 | A | 11/1998 | Hirosawa et al. |
| 5,974,113 | A | 10/1999 | Bruijns et al. |
| 6,735,330 | B1 | 5/2004 | Van Metter et al. |
| 7,057,645 | B1 | 6/2006 | Hara et al. |
| 7,379,561 | B2 | 5/2008 | Chauville et al. |
| 7,415,133 | B2 | 8/2008 | Ikeda et al. |
| 7,609,320 | B2 | 10/2009 | Okamura |
| 7,817,186 | B2 | 10/2010 | Tamamura |
| 2002/0047911 | A1 | 4/2002 | Tsuchiya et al. |
| 2002/0135688 | A1 | 9/2002 | Niikawa |
| 2003/0117518 | A1 | 6/2003 | Pyle |
| 2004/0145673 | A1 | 7/2004 | Washisu |
| 2004/0238718 | A1 | 12/2004 | Washisu |
| 2006/0083438 | A1 | 4/2006 | Donomae et al. |
| 2006/0140604 | A1 | 6/2006 | Suda |
| 2006/0238623 | A1 | 10/2006 | Ogawa |
| 2006/0239583 | A1 | 10/2006 | Safonov |
| 2008/0002030 | A1 | 1/2008 | Sakurai et al. |

FOREIGN PATENT DOCUMENTS

| | | |
|---|---|---|
| CN | 1685710 A | 10/2005 |
| JP | 2004-140484 A | 5/2004 |

(Continued)

OTHER PUBLICATIONS

U.S. Appl. No. 11/895,466; First Named Inventor: Keiichi Sakurai; Title: "Image Pickup Apparatus"; Filed: Aug. 24, 2007.

(Continued)

*Primary Examiner* — Joseph P Martinez
(74) *Attorney, Agent, or Firm* — Holtz, Holtz, Goodman & Chick, PC

(57) ABSTRACT

Disclosed is an image synthesizer including an image frames memory which memorizes a plurality of image frames which are produced by continuously taking pictures of a subject, an image synthesizer which synthesizes a plurality of image frames to a summation image, an image brightness adjuster which adjusts brightness of the summation image by synthesizing the image frames with the image synthesizer, and a display which displays the summation image which is being synthesized by the image synthesizing means in the image brightness adjusting processing.

4 Claims, 14 Drawing Sheets

FOREIGN PATENT DOCUMENTS

| | | |
|---|---|---|
| JP | 2004-219765 A | 8/2004 |
| JP | 2005-038396 A | 2/2005 |
| JP | 2005-354166 * | 12/2005 |
| JP | 2005-354166 A | 12/2005 |
| JP | 2006-020096 A | 1/2006 |
| JP | 2006-054698 A | 2/2006 |
| JP | 2006-166252 A | 6/2006 |
| TW | 200417258 A | 9/2004 |
| WO | WO 2006/064936 A1 | 6/2006 |

OTHER PUBLICATIONS

Chinese Office Action dated Oct. 12, 2010 (and English translation thereof) in counterpart Chinese Application No. 200910118582.2.

Japanese Office Action dated Feb. 2, 2010 and English translation thereof issued in a counterpart Japanese Application No. 2008-055289.

* cited by examiner

FIG. 14
| 1 | GET MORE BRIGHTNESS |
| 2 | MAKE MORE CLEAN AT CURRENT BRIGHTNESS |
| 3 | STORE THIS IMAGE |
FIG. 15
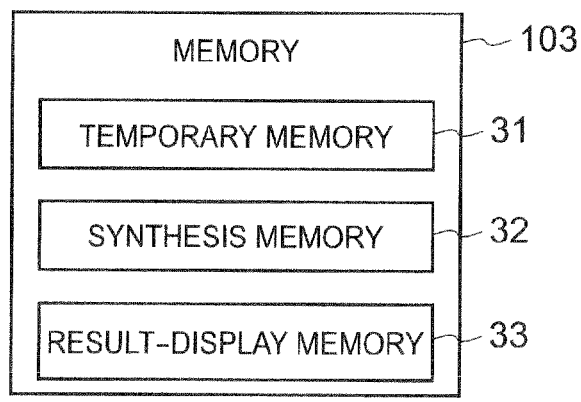
FIG. 16
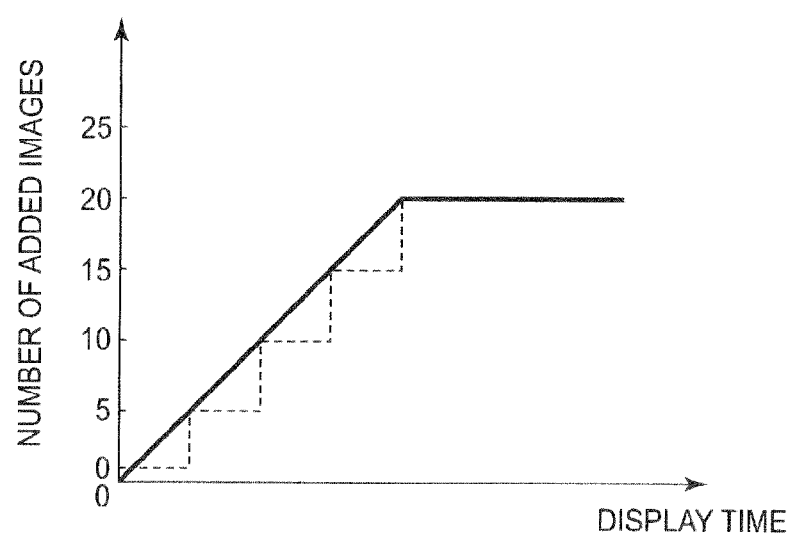

IMAGE SYNTHESIZING APPARATUS AND IMAGE PICKUP APPARATUS WITH A BRIGHTNESS ADJUSTING PROCESSING

BACKGROUND OF THE INVENTION

1. Field of the Invention

The present invention relates to an image pickup apparatus or an image synthesizing apparatus which synthesizes a plurality of image frames produced by continuously taking images of a subject to produce a synthesized image.

2. Description of Related Art

A conventional image pickup apparatus such as a digital camera forms an optical image of a subject by means of an optical lens, and converts the optical image into an electric signal by means of an image pickup device such as a CMOS image sensor.

As a method for taking images in a dark place, there is known a method in which images of a subject are continuously taken with exposure time having smaller hand jiggle, the images are added while correcting motion of the plurality of images, thereby producing one image (e.g., see U.S. Pat. No. 7,057,645).

In the case of the patent document 1, however, a predetermined number of images are collectively continuously taken previously and then, the images are synthesized into one image. Therefore, a brightness of the synthesized image might be different from a desired by user.

SUMMARY OF THE INVENTION

According to one aspect of the present invention, an image synthesizing apparatus comprising: an image frames memory which memories a plurality of image frames which is produced by continuously taking pictures of a subject; an image synthesizer which synthesizes a plurality of image frames to a summation image; an image brightness adjuster which adjusts brightness of the summation image by synthesizing the image frames with the image synthesizer; and a display which displays the summation image which is being synthesized by the image synthesizing means in the image brightness adjusting processing.

According to another aspect of the present invention, an image pickup apparatus comprising: a picture-taking device which executes continuously taking pictures of a subject to output a plurality of image frames; an image frames memory which memories a plurality of image frames which is produced by the picture-taking device; an image synthesizer which synthesizes a plurality of image frames to a summation image; an image brightness adjuster which adjusts brightness of the summation image by synthesizing the image frames with the image synthesizer; and a display which displays the summation image which is being synthesized by the image synthesizing means in the image brightness adjusting processing.

BRIEF DESCRIPTION OF THE DRAWINGS

FIG. 14 is a menu table concerning the image synthesis processing shown in FIG. 11;

FIG. 15 is a block diagram showing a structure of an essential portion of a memory provided in a digital camera according to a second embodiment to which the invention is applied;

FIG. 16 is a schematic diagram showing a correspondence relation between the number of image frames to be added concerning the continuous picture-taking processing by the digital camera shown in FIG. 1 and display time of the summation image;

DETAILED DESCRIPTION OF THE PREFERRED EMBODIMENT

Concrete embodiments of the present invention will be explained using the drawings. The scope of the invention is not limited to the illustrated examples.

First Embodiment

Figure 1:
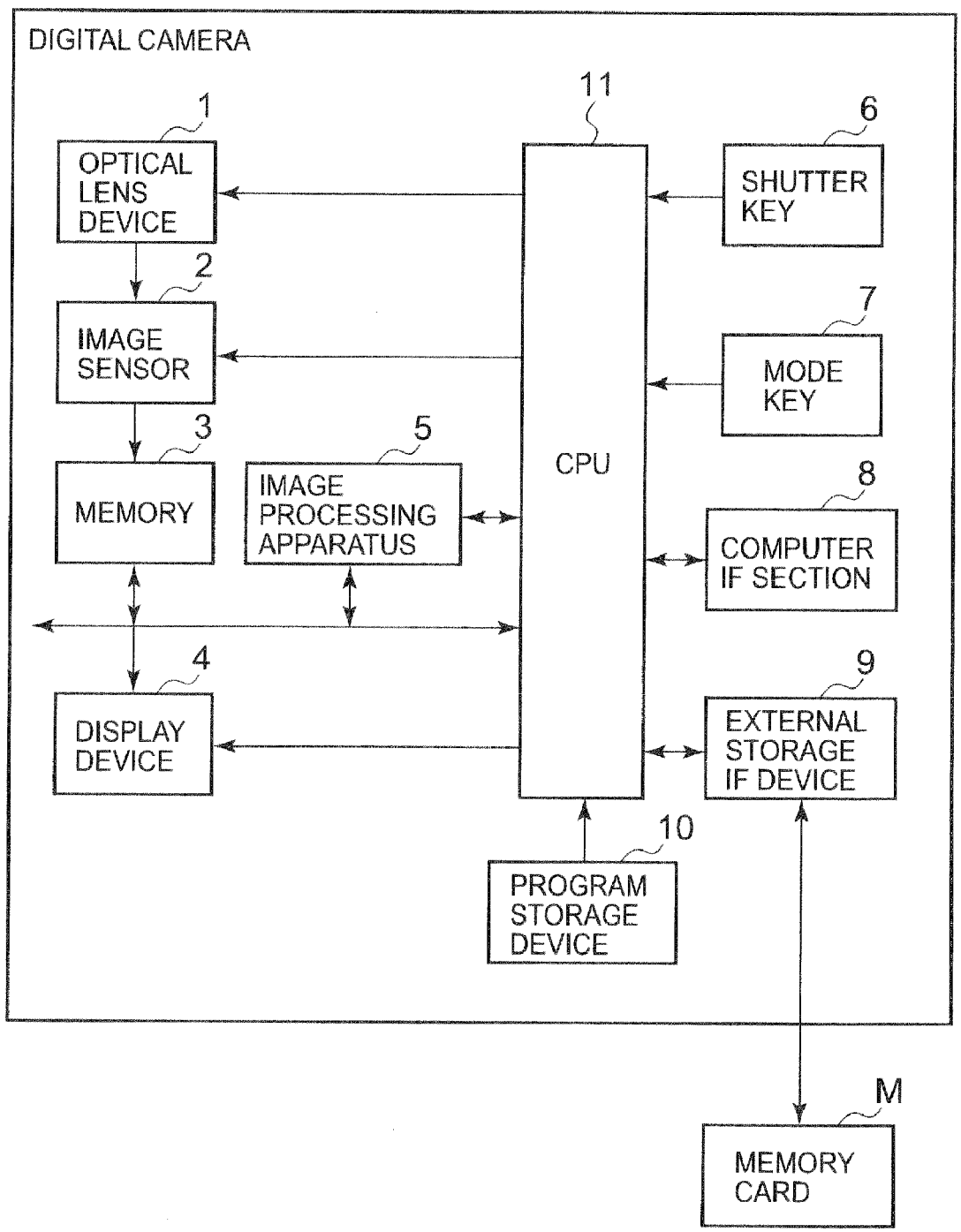
FIG. 1 is a schematic block diagram showing a structure of a digital camera according to a first embodiment to which the present invention is applied.

FIG. 1 is a block diagram showing an outline structure of a digital camera 100 of the first embodiment to which the present invention is applied. The digital camera (image pickup apparatus) 100 of the first embodiment displays a halfway synthesized image, which is added plurality of image frames for adjusting brightness, on the display 4 during shatter button 6 is pressed by the user. More specifically, the digital camera 100 includes an optical lens device 1, an image sensor 2, a memory 3, a display device 4, an image processing apparatus 5, a shutter key 6, a mode key 7, a computer IF section 8, an external storage IF device 9, a program storage device 10 and a CPU 11.

The shutter key 6 outputs a picture-taking command of a subject to the CPU 11. That is, the shutter key 6 constitutes a picture-taking operation input section which outputs and inputs a picture-taking command of a subject using the optical lens device 1 and the image sensor 2 to and from the CPU 11 based on a push-down operation by a user in the continuous picture-taking mode.

The mode key 7 comprises a dial for selecting a picture-taking mode based on operation of a user. More concretely, the single picture-taking mode, the continuous picture-taking mode and the like can be selected using the mode key 7.

The optical lens device 1 includes a picture-taking lens and its driving section, and collects light reflected by a subject and forms an image on the image sensor 2.

The image sensor 2 includes a CCD. The image sensor 2 and captures the formed image as digitalized image data. The image sensor 2 is controlled by the CPU 11. When a user does not push down the shutter key 6, the image sensor 2 produces a high speed frame (digital image data) having shorter exposure time for preview, periodically reads about 30 image data per one second and outputs the same to the memory 3. If the shutter key 6 is pushed down by a user, the image sensor 2 produces image data of high-resolution image data and outputs the image data to the memory 3. The image sensor 2 can adjust the picture-taking sensitivity (ISO sensitivity) in accordance with brightness of a subject under control of the CPU 11.

While the shutter key 6 is pushed down by a user in the continuous picture-taking mode, the image sensor 2 carries out exposure a plurality of times continuously for a short time as picture-taking means, thereby continuously taking images of a subject, and outputs a plurality of image frames.

The memory 3 temporarily stores preview image data which is output from the image sensor 2, high-resolution image data, original image data which is image-processed by the image processing apparatus 5, and processed image data. The memory 3 outputs the temporarily stored image data to the display device 4 or the image processing apparatus 5. The memory 3 is also used as a working area memory of the CPU 11.

The display device 4 includes a liquid crystal monitor on which an image is displayed. The display device 4 displays a preview which is temporarily stored in the memory 3 and a high-resolution real picture-taking image.

The image processing apparatus 5 carries out image synthesizing processing of summation image, and compressing processing of image data for image data which is temporarily stored, under control of CPU 11.

When the digital camera 100 is connected to a computer (not shown), the computer IF section 8 functions as a USB storage class driver. With this, the computer connected to the digital camera 100 handles a memory card as an external storage device of the computer.

The external storage IF device 9 inputs and outputs image data to and from the memory card M. The memory card M stores image data which is output from the external storage IF device 9 as an external storage device.

The program storage device 10 comprises a ROM and a flash memory, and stores a program which is executed by the CPU 11.

The CPU 11 controls the entire system collectively in accordance with a program stored in the program storage device 10. More specifically, if operation information which is output based on a predetermined operation of the shutter key 6 by a user is input, the CPU 11 controls the image sensor 2, the memory 3, the display device 4, the image processing apparatus 5 and the like based on the operation information, and carries out the picture-taking processing of an image and the synthesizing processing. The CPU 11 instructs the memory card M to store high-resolution image data which is compressed in the JPEG format through the external storage IF device 9, and reads image data from the memory card M.

The image synthesizing processing by the image processing apparatus 5 will be explained in detail with reference to FIG. 2. The image synthesizing processing synthesizes a plurality of image stored in the memory card M, the plurality of image which is picked up by the image sensor 2 in the continuously picking up mode.

Figure 2:
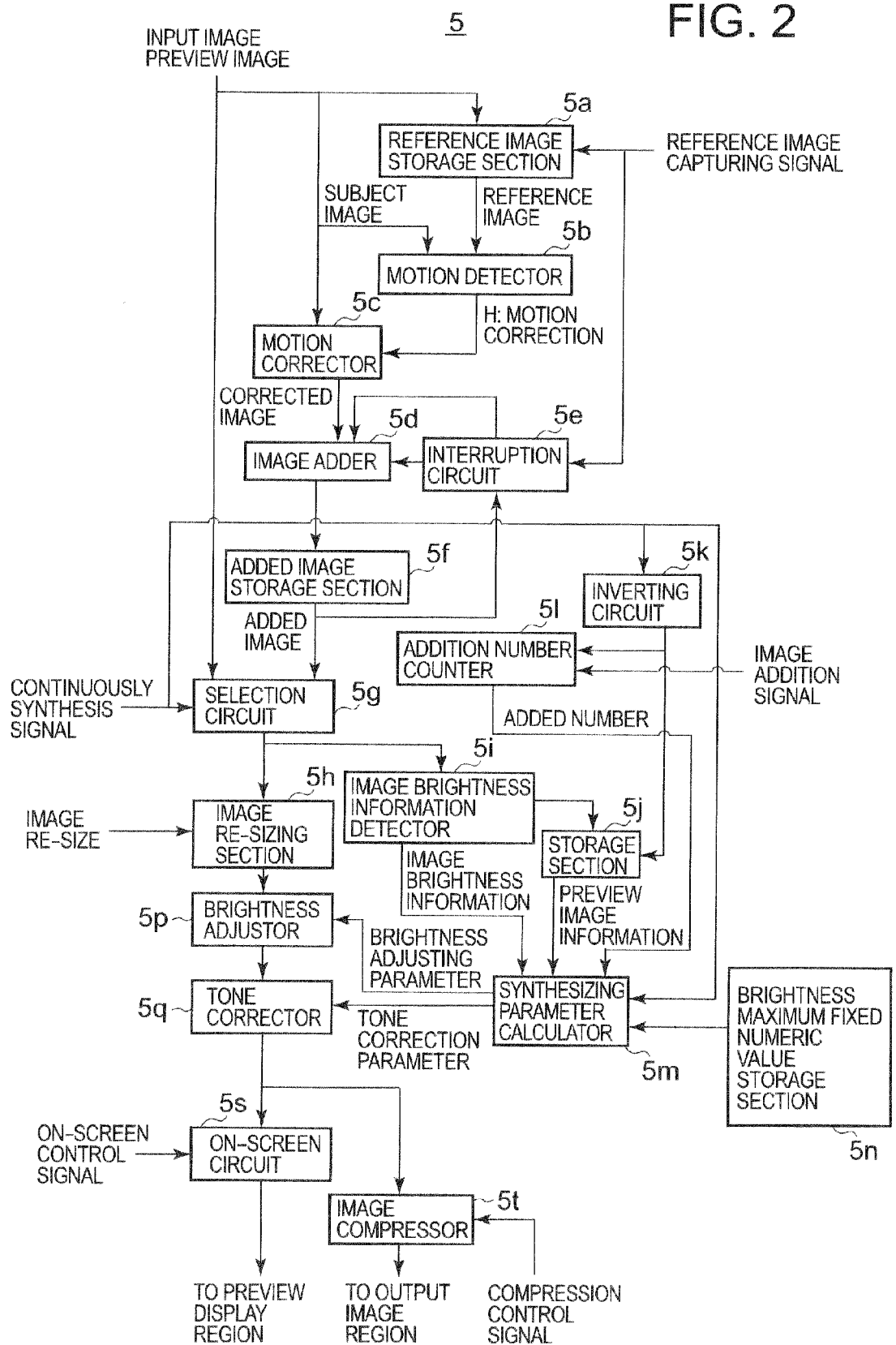
FIG. 2 is a block diagram showing a structure of an essential portion of an image processing apparatus provided in the digital camera shown in FIG. 1.

As shown in FIG. 2, the image processing apparatus 5 includes a reference image storage section 5a, a motion detector 5b, a motion corrector 5c, an image adder 5d, an interruption circuit 5e, a summation image storage section 5f, a selection circuit 5g, an image re-sizing section 5h, an image brightness information detector 5i, a storage section 5j, an inverting circuit 5k, an addition number counter 5l, a synthesizing parameter calculator 5m, a brightness maximum fixed numeric value storage section 5n, a brightness adjustor 5p, a tone corrector 5q, a comparator 5r, an on-screen circuit 5s, an image compressor 5t and the like.

The reference image storage section 5a stores an image frame which is designated and read out from one of image flames in the memory card M as a reference image. The reference image storage section 5a outputs the stored reference image to the motion detector 5b. More specifically, the reference image storage section 5a outputs the same image as an input image as the reference image while a reference image take-in signal which is output from the CPU 11 is input.

The motion detector 5b compares and determines a reference image which is output and input from the reference image storage section 5a and an object image which is newly read out from the memory card M with each other, and detects motion. That is, the motion detector 5b compares and determines a first reference image and an object image with each other as a criterion image for detecting a motion amount of second and subsequent images. For example, when an image which is same as the image input from the reference image storage section 5a is output, the motion detector 5b determines that the output image and an object image which is read out from the memory card M are the same, and outputs a motion correction H as no motion.

The motion corrector 5c carries out motion correction: H of an image which is read out from the memory card M, and outputs a corrected image. Since motion correction is not required when the image is a first image, the motion corrector 5c outputs the input image to the image adder 5d as a correction image signal as it is.

The image adder 5d adds (synthesizes) a plurality of image frames which are read out from the memory card M as image synthesizing means, and produces a summation image. That is, the image adder 5d add a corrected image signal which is output and input from the motion corrector 5c in the continuous picture-taking mode (which will be described later) and a summation image which is output from the summation image storage device and which is input through the interruption circuit 5e. When a reference image take-in signal is input to a control terminal of the interruption circuit 5e, a signal which is input to the interruption circuit 5e is interrupted and "0" is output. Therefore, the image adder 5d outputs image data which is output and input from the motion corrector 5c to the summation image storage section 5f.

The summation image storage section 5f stores image data which is output and input from the image adder 5d. The summation image storage section 5f outputs stored image data (summation image) to the selection circuit 5g and the interruption circuit 5e.

The selection circuit 5g switches between a signal which is output from the image sensor 2 and a signal which is output from the summation image storage section 5f based on a continuous picture-taking and synthesizing signal which is output and input from the CPU 11. More specifically, when the continuous picture-taking and synthesizing signal is "0", the selection circuit 5g selects input of a signal which is output from the image sensor 2, and when the synthesizing signal is "1", the selection circuit 5g selects input of a signal which is output from the summation image storage section 5f. The selection circuit 5g outputs the input signal to the image re-sizing section 5h and the image brightness information detector 5i.

The image re-sizing section 5h changes a size of an image which is output and input from the selection circuit 5g based on an image re-size signal which is output and input from the CPU 11. The image re-sizing section 5h sets an image size to the minimum image size (QVGA size) for preview image or the maximum image size for a real picture-taking image and changes. The image re-sizing section 5h outputs an image after it was re-sized to the brightness adjustor 5p.

The image brightness information detector 5i detects brightness information of an image based on an input image. More specifically, the image brightness information detector 5i converts brightness based on an input image signal, selects a measuring region portion (image central portion or the like) for measuring brightness of the image, and prepares a histogram. When image data sets are sequentially input, the histogram is measured whenever image data of the image central portion is input. The image brightness information detector 5i detects a brightness distribution of an image based on the measured histogram, and outputs the brightness distribution to the synthesizing parameter calculator 5m and the storage section 5j as image brightness information.

The storage section 5j stores image brightness information which is output and input from the image brightness information detector 5i based on input of an inverted signal "1" which is output from the inverting circuit 5k.

The addition number counter 5l counts addition number which is the number of added (synthesized) image frames and adds 1 to a counter value based on an image addition signal which is output and input from the CPU 11. When the continuous picture-taking and synthesizing signal is "0", the signal is inverted to "1" by the inverting circuit 5k, and is input to a clear signal terminal, and the addition number counter 5l clears the counter value (to "0"). The addition number counter 5l outputs the addition number to the synthesizing parameter calculator 5m.

Whenever the image brightness information which is output from the image brightness information detector 5i is input to the synthesizing parameter calculator 5m, the synthesizing parameter calculator 5m gain-adjusts the brightness of the output image from the average value of the histogram based on the image brightness information. The synthesizing parameter calculator 5m outputs the calculated brightness gain to the brightness adjustor 5p as a brightness adjusting parameter.

Figure 3:
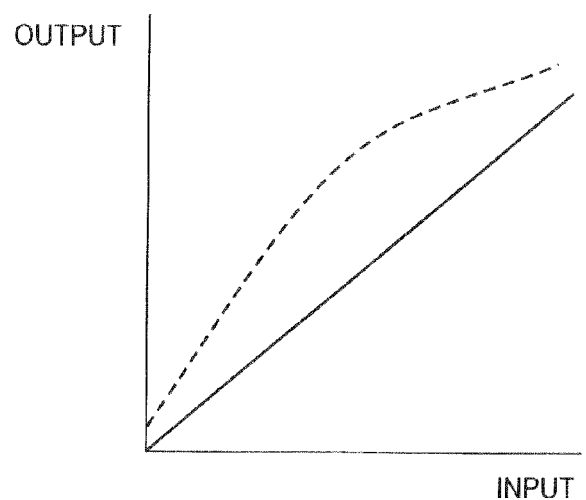
FIG. 3 is a schematic diagram showing tone curve concerning tone adjusting processing by the image processing apparatus shown in FIG. 2.

The synthesizing parameter calculator 5m calculates a tone correcting parameter by the tone corrector 5q based on the image brightness information of a summation image which is output and input from the image brightness information detector 5i. Specifically, the synthesizing parameter calculator 5m calculates the tone correcting parameter such that the brightness is equal to or lower than predetermined brightness until the summation image reaches a desired S/N value and that a dark portion in the image becomes more bright as the addition number is increased. That is, the synthesizing parameter calculator 5m calculates the tone correcting parameter for changing a tone curve to a straight line (solid line in FIG. 3) during the brightness adjustment processing by user's instruction, or the tone correcting parameter for changing the tone curve to such a curved line that a dark portion becomes more bright (broken line in FIG. 3) to adjust the extension amount of the dark portion after change to a noise reduction processing by user's instruction.

The brightness adjustor 5p adjusts the brightness of the input image based on a brightness gain (brightness adjusting parameter) calculated by the synthesizing parameter calculator 5m, and outputs the same to the tone corrector 5q and the image compressor 5t. Even if an image having brightness of a certain level or higher is input, a number in which the brightness adjusting parameter is one or less is input, and the brightness adjustor 5p adjusts the brightness to an appropriate value.

The tone corrector 5q changes the tone curve based on the tone correction parameter calculated by the synthesizing parameter 5m, adjusts a tone of the input image, and outputs the same to the on-screen circuit 5s. "That is, the tone corrector 5q executes the tone adjusting processing for adjusting the tone of the summation image as tone adjusting means. More specifically, the tone corrector 5q changes the tone correcting parameter g before and after a pressing instruction for the shatter button 6 by the user during the brightness controlling process, so that the tone adjusting processing becomes different. For example, when the processing is changed to the noise reduction by the user's instruction, the tone corrector 5q changes the tone curve to such a curve (broken line in FIG. 3) that a dark portion of the image becomes more bright, thereby adjusting the extended amount of the dark portion.

To adjust the tone curve, g correction using g obtained by the following equation (1) is applied, a picture element x which is input to the following equation (2) is converted and is output as y by this g correction.

Equation (1)

$$\gamma = \begin{cases} 1.0 & \text{(Brightness adjusting process)} \\ 1.0 + ak & \text{(Noise reduction process)} \end{cases} \quad (1)$$

Equation (2)

$$y = x_{max} \times (x/x_{max})^{1/\gamma} \quad (2)$$

Here, the symbol "k" is a number of adding flames in the noise reduction process, the symbol "a" is a constant from 0 to 3, the value 0 represents "no change", as the value becomes higher, the variation amount in the extended amount of the dark portion per one shoot is increased. The input picture element x is 0 or higher and equal to the maximum value xmax or less. The maximum value xmax is obtained by multiplying a value stored in the brightness maximum fixed numeric value storage section 5n by the addition number.

Figure 4:
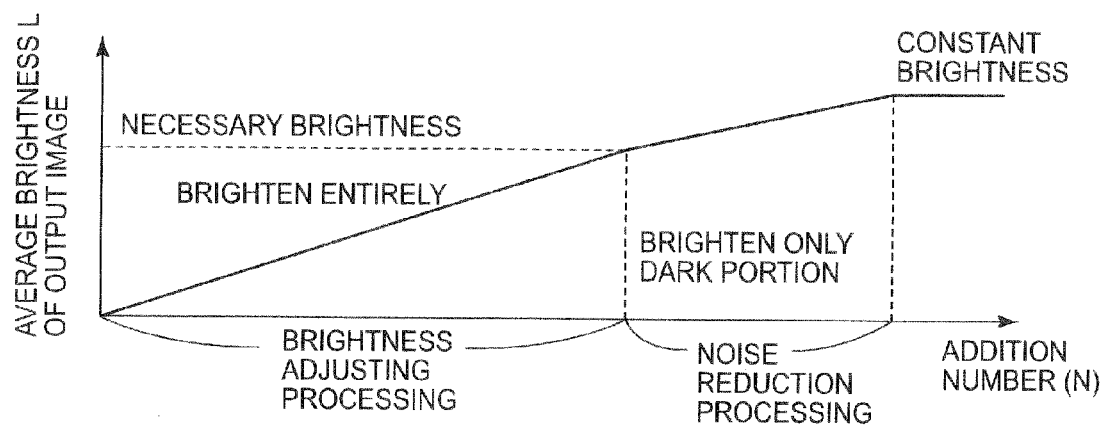
FIG. 4 is a diagram showing a correspondence relation between the addition number by the digital camera shown in FIG. 1 and brightness of output image.
Figure 5:
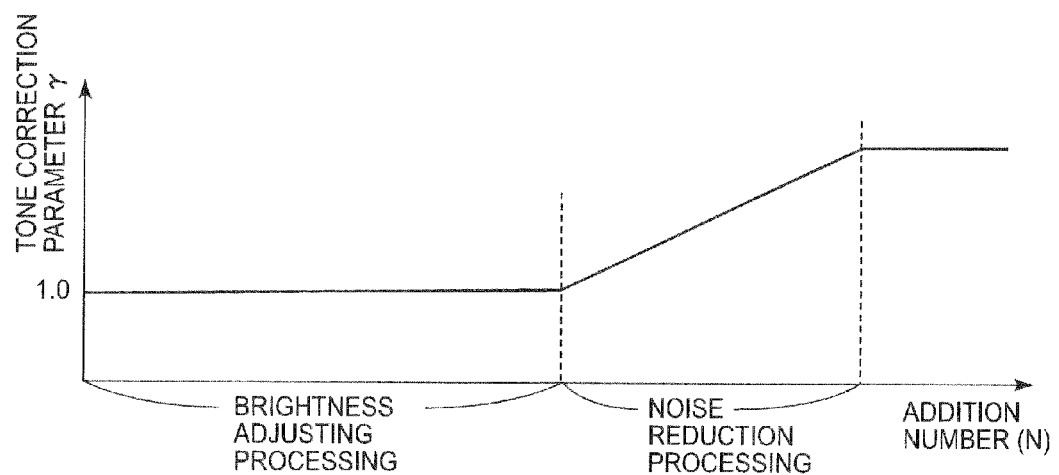
FIG. 5 is a diagram showing one example of a correspondence relation between the addition number and a tone correcting parameter concerning the tone adjusting processing by the digital camera shown in FIG. 1.

A correspondence relation between the brightness (average brightness L) of an output image, a brightness adjusting parameter G and a tone correcting parameter g will be explained in more detail with reference to FIGS. 4 and 5. FIG. 4 is a diagram showing a correspondence relation between the addition number (N) when images are continuously taken by a digital camera and brightness (average brightness L) of an image which is output in accordance with the addition number.

As shown in FIG. 4, the entire image is gradually brightened in accordance with the addition (synthesis) number. If the user judges that the image obtains enough brightness and makes an instruction for that, only a dark portion in the image is brightened and a bright portion in the image is not further brightened to avoid overflow. If the dark portion is excessively brightened, contrast of the entire image is lowered. Therefore, when the addition number is further increased, control is performed such that the brightness of the output image becomes substantially constant and the image is output.

Next, a case where brightness of an output image is controlled by tone correction will be explained with reference to FIG. 8. As shown in FIG. 8, the tone correcting parameter g value is 1.0 and is constant until the brightness reaches the user's expectation level, and after the number reaches the necessary number, g is gradually increased, and a dark portion is brightened. And if the g value reaches a designated value, the brightness is set to a constant value. With this, as shown in FIG. 4, only the brightness of the output image can be changed without changing the tone until the brightness reaches the user's requirement, and after the brightness reaches the user's requirement, the gain is set to a substantially constant value and the tone correcting parameter g is increased. With this, it is possible to correct such that a dark portion is brightened while maintaining the brightness of a bright portion. If the addition number is further increased, the tone correcting parameter g value becomes substantially constant, and images having substantially constant brightness are output thereafter.

The on-screen circuit 5s outputs first image flame or processed sum images, based on an on-screen control signal which is output from the CPU 11.

The image compressor 5t executes the image compressing processing for compressing a synthesized image which is output and input from the tone corrector 5q into a JPEG image based on a compression control signal which is output and input from the CPU 11. The image compressor 5t compresses the synthesized image into the JPEG image, and outputs the same to an output image region in the memory 3 as a compression image signal.

The image processing apparatus 5 having the above-described structure executes the image brightness adjusting processing with the image adder 5d by adding read out continuously taken image frames to obtain a predetermined S/N value, in accordance with a user's pushing down operation of the shutter key 6. More specifically, the image processing apparatus 5 changes the brightness adjusting parameter G to change the image brightness adjusting processing if the user a pressing the shutter key 6 in the image brightness adjusting processing. The image processing apparatus 5 executes the noise reducing processing in which an image frames are further added to the summation image after the image brightness adjusting processing by the image adder 5d while a user pushes down the shutter key 6, thereby reducing noise N of the summation image. With this, the addition number of the image frames is increased, and the S/N value of the summation image can be improved further.

Figure 6A:
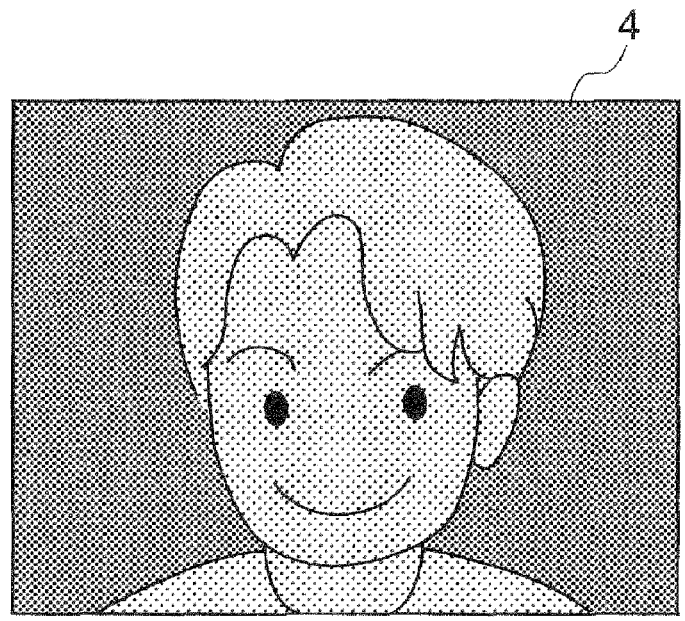
FIG. 6A is a schematic diagram showing an image of image brightness adjusting processing by the image processing apparatus shown in FIG. 2.
Figure 6B:
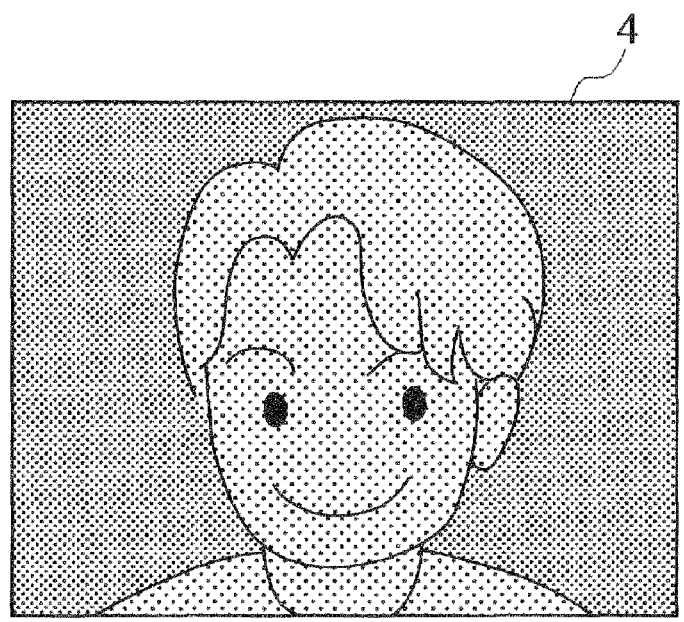
FIG. 6B is a schematic diagram showing an image of image brightness adjusting processing by the image processing apparatus shown in FIG. 2.
Figure 7A:
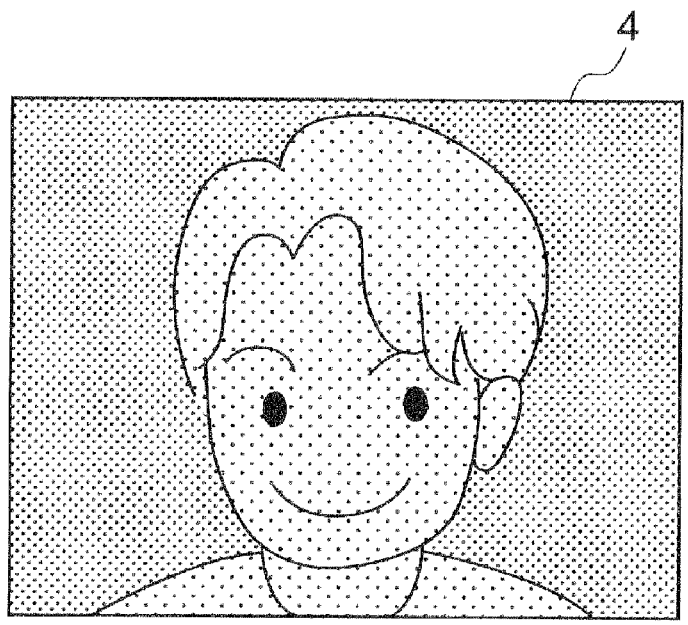
FIG. 7A is a schematic diagram showing an image of image brightness adjusting processing by the image processing apparatus shown in FIG. 2.
Figure 7B:
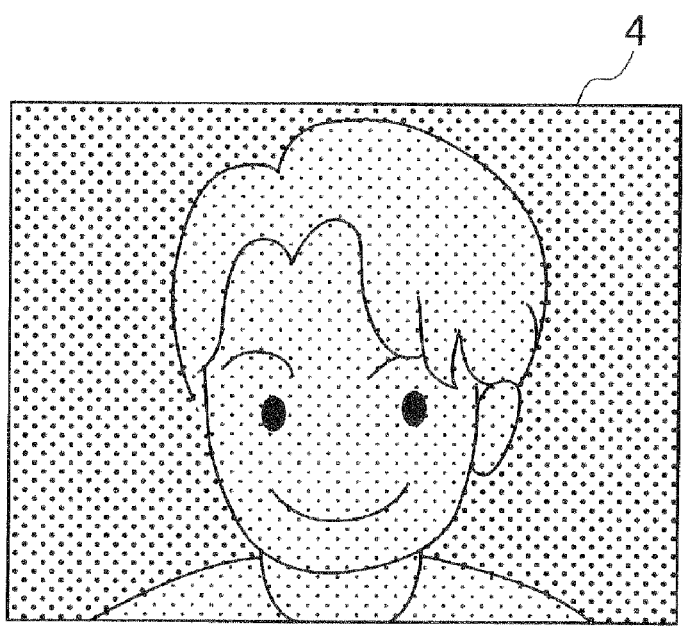
FIG. 7B is a schematic diagram showing an image of image brightness adjusting processing by the image processing apparatus shown in FIG. 2.
Figure 8A:
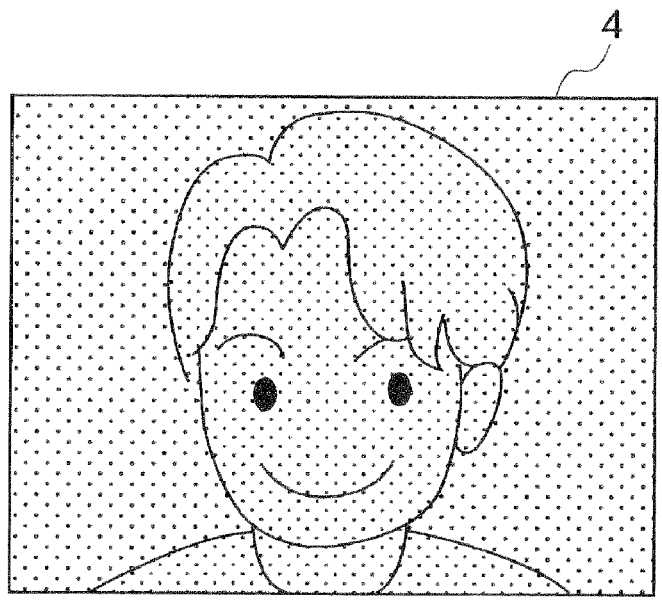
FIG. 8A is a schematic diagram showing an image of image brightness adjusting processing by the image processing apparatus shown in FIG. 2.
Figure 8B:
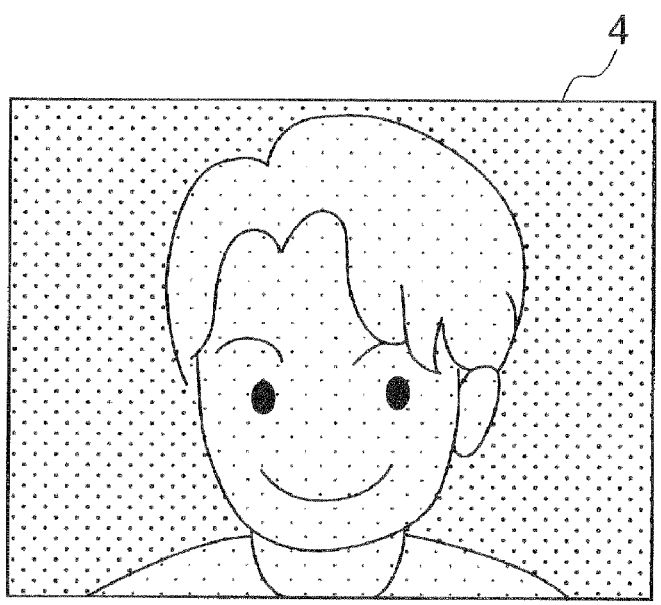
FIG. 8B is a schematic diagram showing an image of image brightness adjusting processing by the image processing apparatus shown in FIG. 2.
Figure 9A:
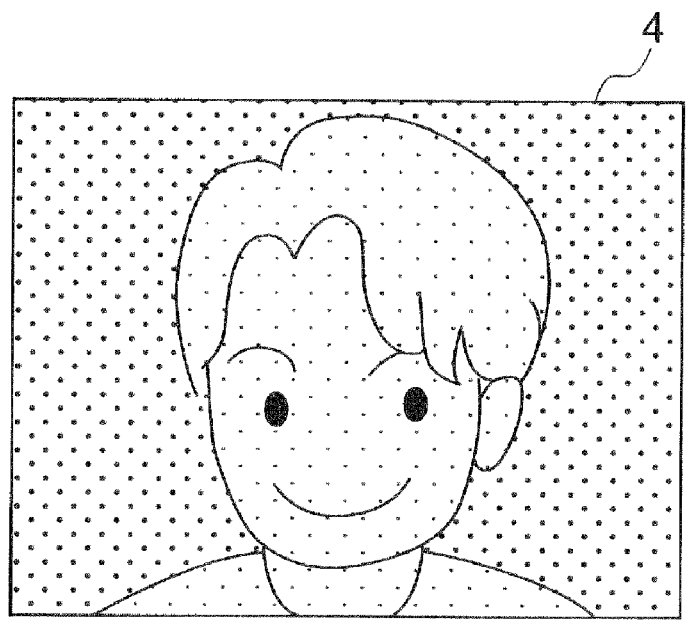
FIG. 9A is a schematic diagram showing an image of image brightness adjusting processing by the image processing apparatus shown in FIG. 2.
Figure 9B:
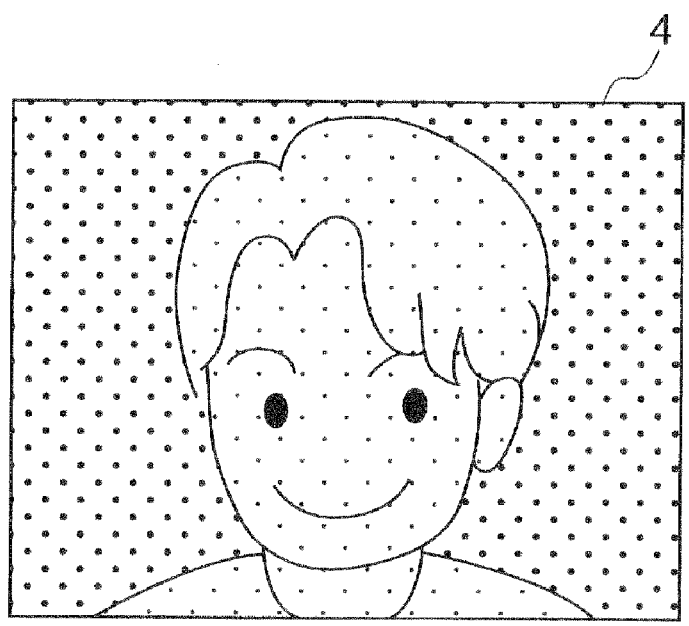
FIG. 9B is a schematic diagram showing an image of image brightness adjusting processing by the image processing apparatus shown in FIG. 2.

An expression of the image on the display device 4 during the image synthesizing processing by the image processor 5 will be explained hereafter. That is, the display device 4 sequentially displays images which are being synthesized by the image adder 5d during the image brightness adjusting processing. More specifically, as shown in FIGS. 6A to 9B, summation images which gradually become brighter in the image brightness adjusting processing are sequentially displayed on the display device 4. FIG. 6A shows an image of one image frame, FIG. 6B shows an image in which two image frames are added, FIG. 7A shows an image in which three image frames are added, FIG. 7B shows an image in which four image frames are added, FIG. 8A shows an image in which five image frames are added, FIG. 8B shows an image in which six image frames are added, FIG. 9A shows an image in which seven image frames are added, and FIG. 9B shows an image in which eight image frames are added. In FIGS. 6A to 9B, as the number of dots on the image is higher, the image is darker.

Figure 10A:
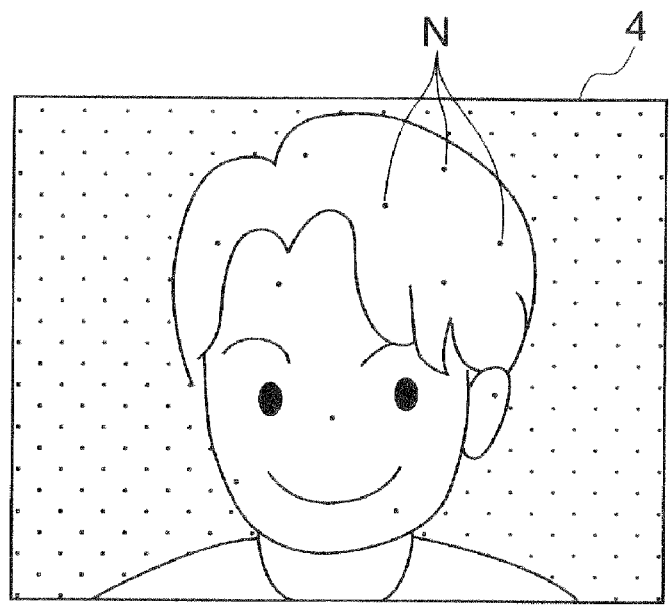
FIG. 10A is a schematic diagram showing an image of noise reducing processing by the image processing apparatus shown in FIG. 2.
Figure 10B:
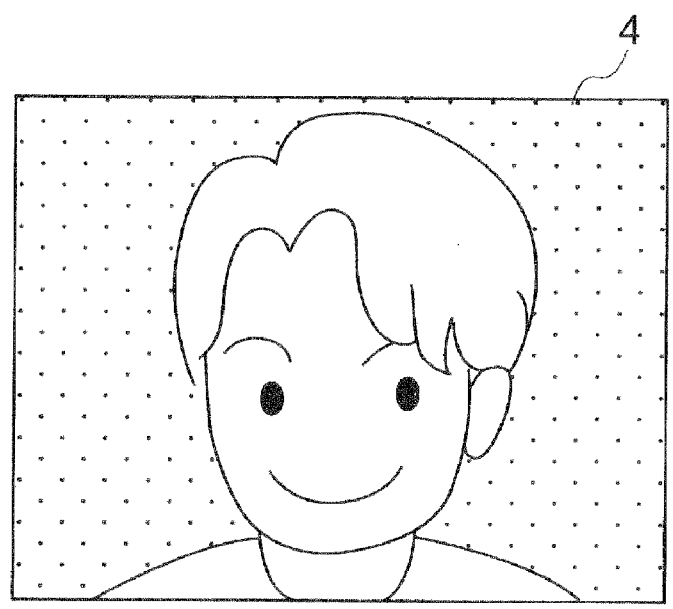
FIG. 10B is a schematic diagram showing an image of noise reducing processing by the image processing apparatus shown in FIG. 2.

The display device 4 displays an image after the noise reducing processing by the image processing apparatus 5. With this, as shown in FIGS. 10A and 10B, by increasing the addition number of the image frames, the brightness of the image (the number of dots of background of a person) is not changed from that shown in FIG. 9B, but clear images from which random noises N are gradually reduced, especially images in which the S/N value of a bright person portion is improved as compared with the background are displayed. FIG. 10A shows an image in which another image frame is added to the summation image in FIG. 9B, and FIG. 10B shows an image in which more image frames are added to the summation image in FIG. 10A.

Figure 11:
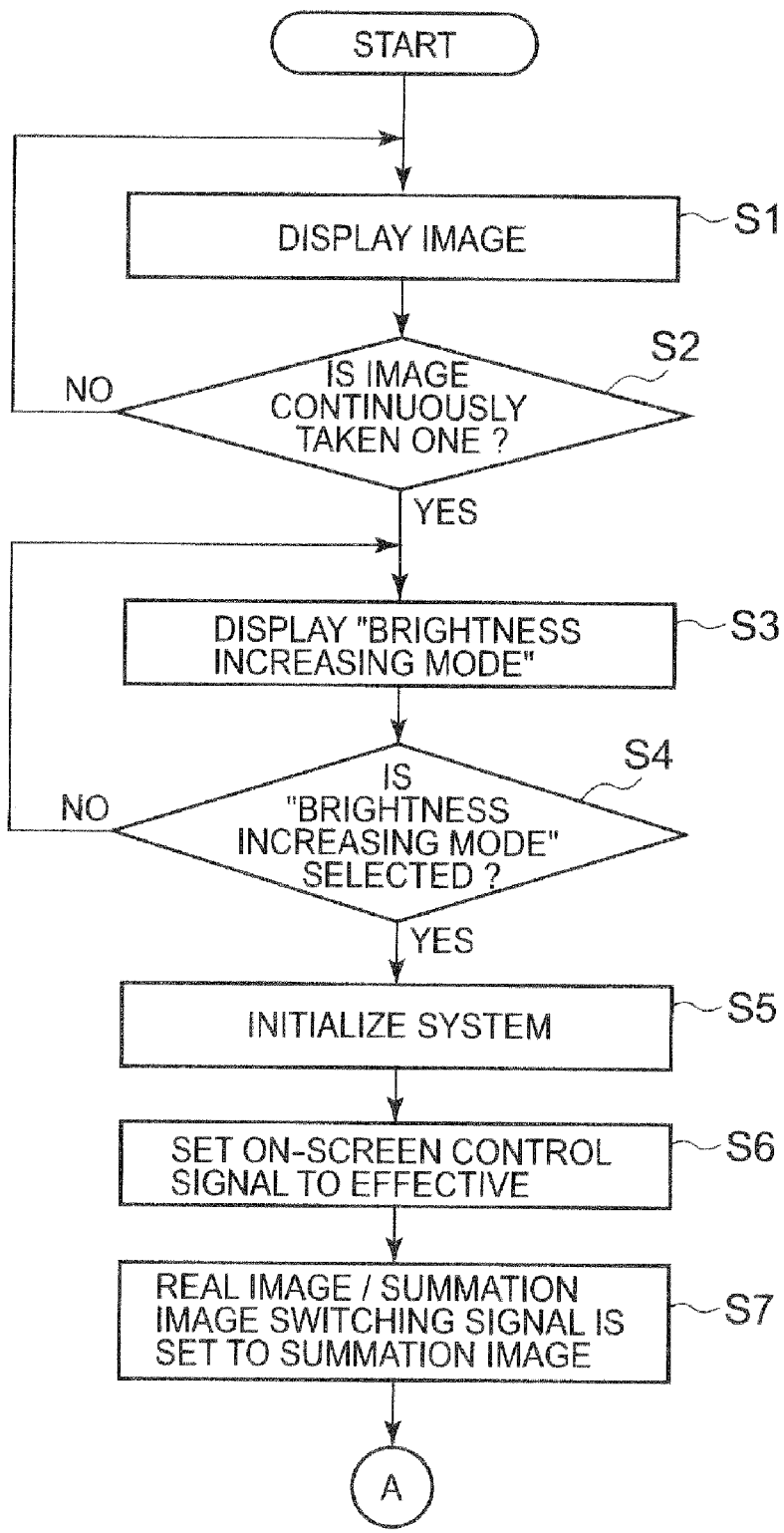
FIG. 11 is a flowchart showing one example of action concerning image synthesizing processing by the digital camera shown in FIG. 1.
Figure 12:
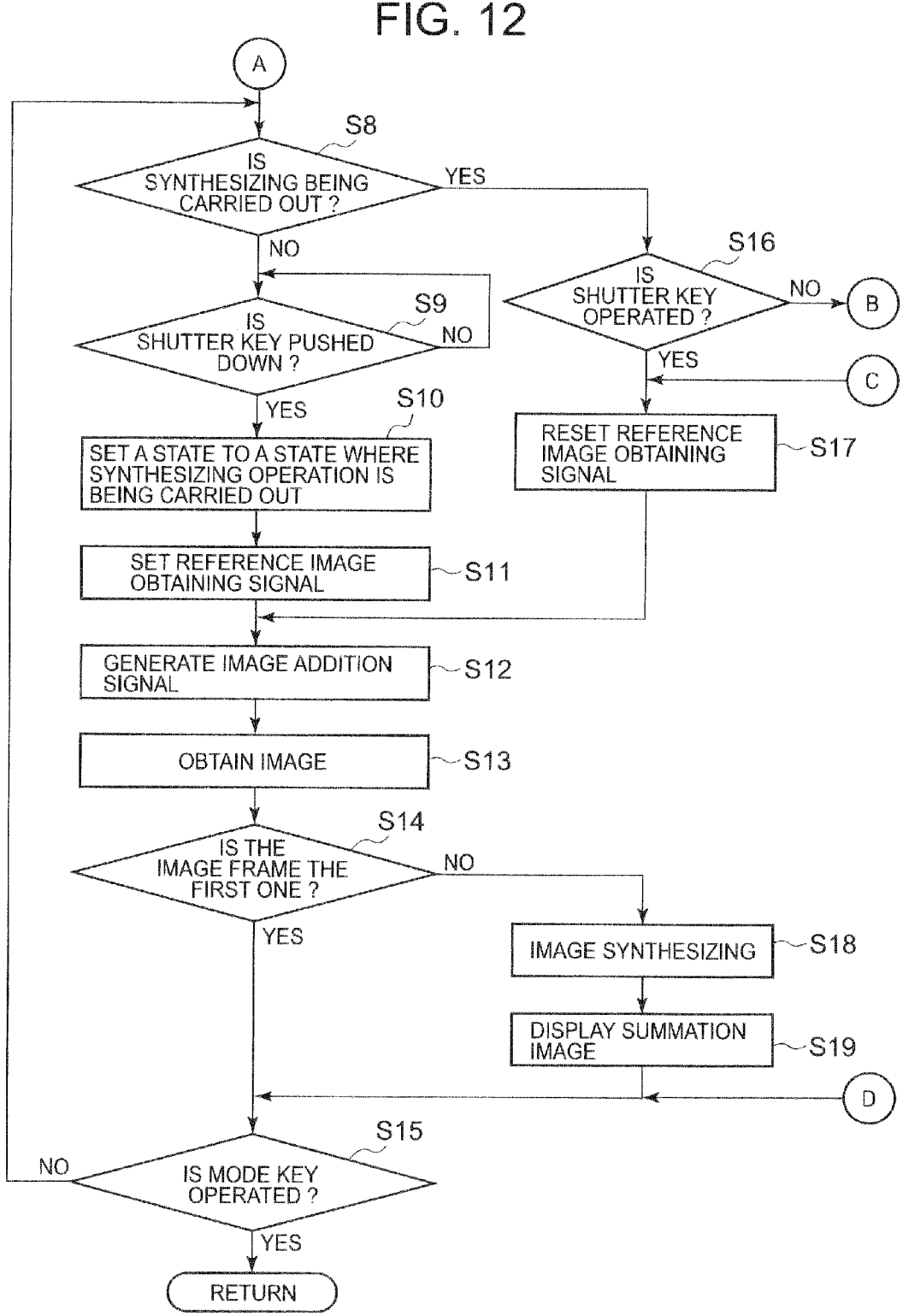
FIG. 12 is a continuation of a flow chart in FIG. 11.
Figure 13:
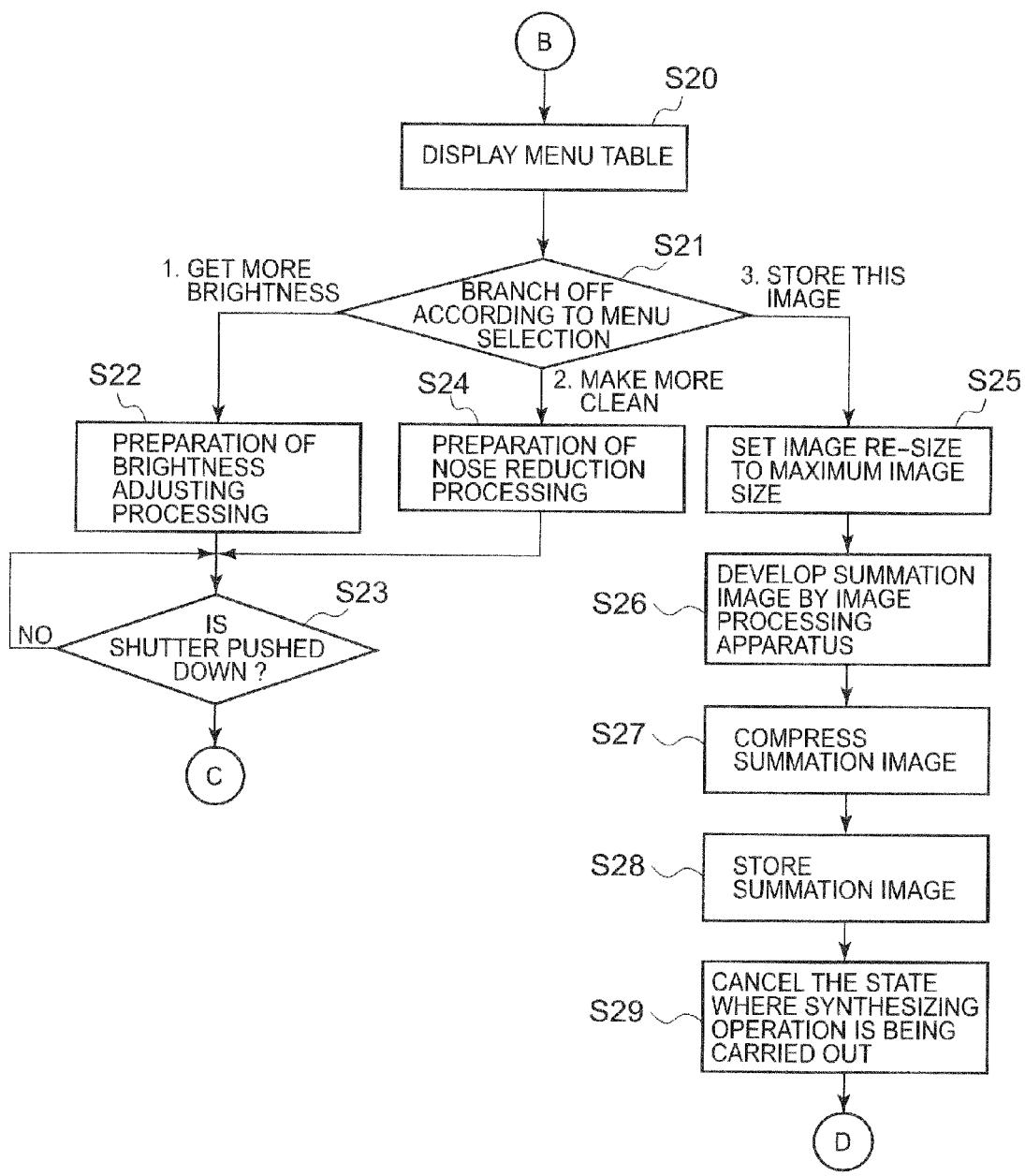
FIG. 13 is a continuation of a flow chart in FIG. 12.

Next, the image synthesizing processing will be explained in detail with reference to FIG. 11 to FIG. 14. FIG. 11 to FIG. 13 are flowcharts showing one example of action of the image synthesizing processing. In the image synthesizing processing which explained hereinafter, it is assumed that a plurality of image are stored in memory card M after a continuously photographing of a subject by the image sensor 2. As shown in FIG. 11, when the play back mode is selected by the user with predetermined operation for mode key 7 after the camera is powered on, the display device 4 displays an image read out from the memory card M under the control of the CPU 11 (step S1).

After the menu button is operated by the user, the CPU 11 judges whether an image displayed on the display 4 is the continuously-taking picture or not (step S2), if the judgement is "YES", the display device 4 displays "Brightness increasing mode" as an option in the menu on the display (step S3). If the brightness increasing mode is selected by a user with the predetermined operation (step S4; YES), the CPU 11 initializes the display device 4 and the image processing apparatus 5 (step S5).

Next, the CPU 11 brings various signals for controlling the image processing apparatus 5 into their continuous picture-taking initial states, and brings an on-screen control signal to "effective" unlike the single picture-taking action (step S6). The CPU 11 sets a real image/summation image switching signal into a real picture-taking image (step S7).

As shown in FIG. 12, the CPU 11 determines whether the synthesizing is being carried out based on the synthesizing signal (step S8). Here, since the synthesizing signal is "0" in the initial state, the CPU 11 determines that the synthesizing is not being carried out (step S8; NO).

The CPU 11 judges whether or not that the shutter key 6 is pushed down (step S9). Then, if a user pushes down the shutter key 6 (step S9; YES), the CPU 11 turns the synthesizing signal into "1", and brings a state into a state where the image synthesizing operation is being carried out (step S10). Then, the CPU 11 outputs a reference image take-in signal of the image processing apparatus 5 to the reference image storage section 5a (step S11).

Next, the CPU 11 produces an image addition signal and outputs the same to the addition number counter 5l (step S12). Since the synthesizing signal is "1", the signal is inverted into "0" by the inverting circuit 5k and is input to a clear signal terminal of the addition number counter 5l. Therefore, the clear control of the counter value is released. Thus, the addition number counter 5l adds 1 to the counter value by input of the image addition signal and thus, the addition number is turned to "1".

The reference image storage section 5a obtains and memorizes an image frame which relates the displayed image on the display device 4 under th control of the CPU 11 (step S13). The CPU 11 judges whether the image frame input to the image processing apparatus is the first image frame or not based on the additional number signal (step S14). If the input image frame is judged as the first image frame (step S14; YES), the CPU 11 judges whether the mode key 7 is operated or not (step S15). When the mode key 7 is not operated (step S15; NO), the procedure proceed to step S8. Since the synthesizing signal is "1", the CPU 11 determines that the continuous picture-taking and synthesizing is being carried out (step S8; YES).

Then, the CPU 11 determines whether a user pushes down the shutter key 6 (step S16). If the user pushes down the shutter key 6 (step S16; YES), the CPU 11 releases the output of the reference image take-in signal (step S17). With this, a second image and subsequent images are not stored in the reference image storage section 5a, and a state where the first image is retained is maintained.

Then, the procedure is shifted to step S12, the CPU 11 produces an image addition signal, adds "1" to the synthesizing number and reads a second image frame of image frames stored in memory card M as an object image at step S13. If the input image frame is not judged as the first image frame (step S14: NO), the image processing apparatus 5 detects a motion between the second image frame and the first image frame with the motion detector 5b, corrects the motion according to amount of the motion with the motion corrector 5c, and adds the motion corrected image to the first image frame with the image adder 5d (step S18). The summation image is stored in the summation image storage section 5f.

In the image processing apparatus 5, whenever an object image is read, motion amounts of the object image and the first image are detected by the motion detector 5b, the motion corrector 5c corrects in accordance with the motion correction amount, and the corrected image is added to the image stored in the summation image storage section 5f. With this, a second image and subsequent images can be superposed on each other while correcting a synthesizing position in accordance with the motion amount. Therefore, even when a picture is taken using hand and hand jiggle is generated, an image having not deviation is added and the images are synthesized.

Then, the image processing apparatus 5 executes the developing processing of the summation image under the control of the CPU 11. Then, the on-screen circuit 5s outputs the summation image since on-screen control signal is "valid". Then, the CPU 11 controls the display device 4 to read out the summation image from a provided area in the memory 3 and display the summation image (step S19; FIG. 6a).

The above operation is repeatedly carried out as long as a user pushes the shutter key 6 (step S16; YES). That is, the image brightness adjusting processing is executed, the image frames are sequentially added, and the summation images whose brightness is gradually increased are synthesized (see FIGS. 6A to 9B).

If the user judges the brightness of the summation images becomes the enough level and releases the pressing operation of the shutter key 6 (step S16; NO), the CPU 11 displays a menu table (see, FIG. 14) on the display device 4 (step S20). The brightness adjusting processing branches off according to selected option by the user from the menu table displayed as followings, "1. Get more brightness", "2. Make more clean at current brightness", "3. Store this image" (step S21). If the user selects "1. Get more brightness", the CPU 11 sets the image processing apparatus 5 and the display device 4 the brightness adjusting processing state (step S22). After the pressing operation of shutter key 6 by the user (step S23; YES), the CPU 11 executes the brightness adjusting processing to add image frames to the summation image (see FIG. 6A to FIG. 9B).

If the user selects "2. Make more clean at current brightness" at step S21, the CPU 11 sets the image processing apparatus 5 and the display device 4 the noise reducing processing state (step S24). After the pressing operation of shutter key 6 by the user (step S23; YES), the CPU 11 executes the noise reducing processing. For addition of the image frames in the noise reducing processing gradually reduces the random noise N and makes the summation image clearer (see FIGS. 10A and 10B).

If the user judges that the summation image has enough brightness and selects "3. store this image" at step S21, the CPU 11 changes the image re-size to an image size of the picture-taking image (step S25) and then, the CPU 11 controls the image processing apparatus 5, reads the summation image stored in the image adder 5d, and carries out the developing processing of the image (step S26). Concretely, the read summation image is output to the image re-sizing section 5h and the image brightness information detector 5i through the selection circuit 5g. The image re-sizing section 5h outputs the taken image to the brightness adjustor 5p while maintaining its size as it is, and the brightness adjustor 5p adjusts the brightness of the image and outputs the same to the image compressor 5t.

The image processing apparatus 5 instructs the image compressor 5t to carry out the image compressing processing, and outputs the compressed image signal to an output image region in the memory 3 (step S27). Then, the CPU 11 reads the compressed image data from the memory 3, outputs the same to the external storage IF device 9, and stores the same in the memory card M (step S28). The image data can be stored as new data either overwrite data. Options may be selected by the user.

The CPU 11 releases the production of the continuous picture-taking and synthesizing signal "1", and terminates the continuous picture-taking processing (step S29).

As described above, according to the digital camera 100 of the first embodiment, the halfway processing of adding image is displayed during the shutter key 6 is pressed by the user. Therefore, the user can wait until the image becomes bright while checking the brightness of the image in the preview image. Especially, the tone adjusting processing is executed, the tone of the summation image is adjusted in accordance with the addition number of the image frames, a user can easily found the addition number of the image frames, and can easily know the releasing timing of the push-down operation of the shutter key 6. In this manner, a user can know a state in which the brightness adjusting processing in the digital camera 100 is appropriately adjusted. Thus, the digital camera 100 can provide excellent usability to the user that the user can control a brightness of an image as he or she likes.

The noise reducing processing is carried out after the image brightness adjusting processing. With this, it is possible to further improve the S/N value of the summation image. Therefore, it is possible to synthesize clear images having reduced random noise N, especially images in which the S/N value in a person portion brighter than background is improved.

Second Embodiment

Figure 17:
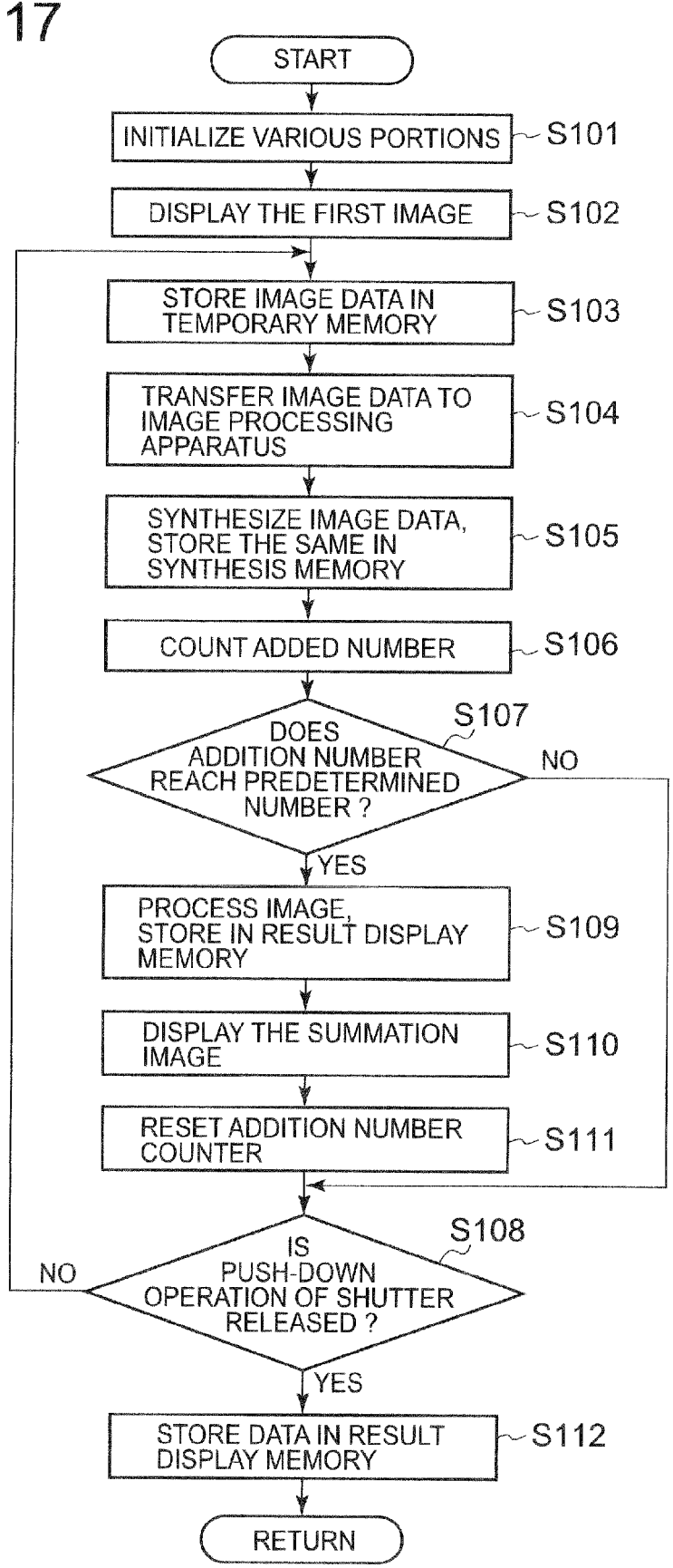
FIG. 17 is a flowchart showing one example of motion of the continuous picture-taking processing by the digital camera shown in FIG. 15.

A digital camera of a second embodiment will be explained with reference to FIGS. 15 to 17. FIG. 15 is a block diagram showing a structure of an essential portion of a memory provided in the digital camera of the second embodiment to which the present invention is applied.

According to the digital camera of the second embodiment, whenever the predetermined numbers of image frames are added by the image processing apparatus 5, summation images produced as a result of the addition are displayed on the display device 4. In the digital camera of the second embodiment, whenever the predetermined pieces of image frames are added, added images produced as a result of the addition are displayed. Except this point, the second embodiment is substantially the same as the first, embodiment, and detailed explanation thereof will be omitted.

That is, as shown in FIG. 15, a memory 103 of the digital camera includes a temporarily storing temporary memory 31. In addition to this, the memory 103 also includes a synthesis memory 32 in which a summation image which is produced whenever an image frame is added is overwritten and stored, and a result-display memory 33 for storing a display image of a result of addition produced when a predetermined number of image frames are added. A summation image is produced whenever a predetermined number (e.g., five) image frames are added by the image adder 5d. The result-display memory 33 stores the summation image during the image brightness adjusting processing.

The display device 4 displays the summation image which is stored in the result-display memory 33 in accordance with the addition number of image frames and which is read from the result-display memory 33. With this, as shown in FIG. 16, a first image is taken, the first image is displayed on the display device 4, when five image frames are added, the five added image is displayed on the display device 4, and when five more image frames are added, the ten added image is displayed on the display device 4. In this manner, a summation image to which image frames is displayed stepwisely until the user judges that the added image (summation image) has enough brightness. In FIG. 16, the solid line shows an addition number, and a broken line shows a displayed image.

Next, the continuous picture-taking processing will be explained in detail with reference to FIG. 17. Here, FIG. 17 is a flowchart showing one example of action of the continuous picture-taking processing.

If the image synthesizing mode is selected by the predetermined operation of the mode key 7 by a user after power is turned ON, the CPU 11 brings the optical lens device 1, the image sensor 2, the image processing apparatus 5, the display device 4 and the like into their initial states (step S101). Then, the CPU 11 controls the various portions of the digital camera, to display the first read out image frame from memory card M on the display device 4 (step S102).

The first image frame is transferred to the temporary memory 31 of the memory 103 and stored therein under the control of the CPU 11 (step S103). Then, the CPU 11 obtains the image data from the temporary memory 31 and transfers the same to the image processing apparatus 5 (step S104).

The image processing apparatus 5 adds the input image data and data of a summation image in the synthesis memory 32 to produce a summation image when the shutter key 6 is pressed by the user, and overwrites the same in the synthesis memory 32 and stores the same (step S105). When the image data transferred to the image processing apparatus 5 in step S104 is image data of the first image frame, since image data stored in the synthesis memory 32 does not exist, data of the first image frame is stored in the synthesis memory 32.

Next, if "1" is added to the addition number (counter value) by a predetermined counter (not shown) (step S106), the CPU 11 determines whether the addition number reaches the predetermined number (e.g., five) (step S107). If the CPU 11 determines that the addition number does not reach the predetermined number (step S107; NO), the CPU 11 determines whether the push-down operation of the shutter key 6 by a user is released (step S108). If the push-down operation of the shutter key 6 by a user is not released, i.e., when the shutter key 6 is still being pushed down, the procedure is shifted to step S103, and the CPU 11 control the execution of subsequent processing.

The addition of image frames is repeatedly carried out, and if it is determined that the addition number reaches the predetermined number in step S107 (step S107; YES), the CPU 11 reads image data of the added image stored in the synthesis memory 32, carried out working processing for displaying the image data on the display device 4 and then, the processed image data is transferred to the result-display memory 33 and stored therein (step S109). The CPU 11 transferred the processed image data to the display device 4, and the addition number to which the predetermined numbers of image frames are added is displayed (step S110).

Then, the CPU 11 resets the counter value of the counter, and the procedure is shifted to step S108. In step S108, if it is determined that the push-down operation of the shutter key 6 by a user is released (step S108; YES), the CPU 11 terminates the continuous picture-taking processing, transfers the image data of the summation image in the result-display memory 33 to the memory card M and stores the same in the memory card M (step S112).

According to the digital camera of the second embodiment, the result-display memory 33 is provided in addition to the synthesis memory 32 in which the summation image is stored, and the summation image stored in the result-display memory 33 is renewed whenever the predetermined number of image frames are added. Therefore, the load of the image processing apparatus 5 concerning the developing processing for displaying an image can be reduced. Further, even if the continuous picture-taking processing is executed while a user pushes down the shutter key 6, the summation image held in the result-display memory 33 is displayed unlike an image to which image frames are sequentially added, a user can take an image while checking the summation image, it is possible for a user to prevent a time lag from generating after a summation image having appropriate brightness until the push-down operation of the shutter key 6 is released, and it is possible to prevent an image of exposure time over from being stored.

Although a picture-taking result is transferred to and stored in the memory card M in the first and second embodiments, the present invention is not limited to this, a saving memory may be provided in an internal storage device such as the memory 103, and the information may be stored in the saving memory.

The addition number of image frames of summation image stored in the result-display memory 33 may be changed manually by a user, or may be automatically changed in accordance with brightness or exposure time.

If the digital camera executes at least the image brightness adjusting processing, the camera may execute the image brightness adjusting processing and the noise reducing processing, or may execute the image brightness adjusting processing and the tone adjusting processing (not shown).

The first and the second embodiment are explained with samples include people as subjects. but the invention is also used for an image synthesizing processing for long time exposure or bulb exposure in an astrophotograph such as constellation picture. For example, a plurality of image are stored during a long time exposure, then the images are added until enough brightness and contrast are obtained.

Not only for the brightness correction, the above synthesizing processing is also used for white balance, tone curve correction, gamma correction or color correction. for example, buttons for "digital strobe", "digital WB", "digital tone curve" or "digital color correction" are prepared on a camera, and those processing will be excuted for synthesizing a plurality of images to a desired image during the button or +/− button is pushed. Then the obtained desired image is stored in the memory card.

The digital camera (image pickup apparatus) 100 was referred as an example of the image synthesizing apparatus, but not limited this example. After the image data produced by the image sensor 2 are sent to a personal computer, or another external apparatus, which connected with the computer IF 8, above explained processings such as the synthesizing processing, the brightness adjusting processing, the display processing for half-way addition or noise reduction processing, can be executed in the personal computer.

INDUSTRIAL APPLICABILITY

The image pickup apparatus of the present invention is useful for informing a user of a state where brightness of a synthesized image is appropriately adjusted. The invention is suitable for providing an image pickup apparatus having excellent usability, and a user of the image pickup apparatus can know the current state thereof during picture taking.

What is claimed is:

1. An image synthesizing apparatus, comprising:
an image frames memory which stores a plurality of image frames which are produced by continuously taking pictures of a subject;
an image synthesizer which synthesizes the plurality of image frames to a summation image;
an image brightness adjuster which adjusts a brightness of the summation image by synthesizing the image frames with the image synthesizer;
a display which displays the summation image which is being synthesized by the image synthesizer in image brightness adjusting processing by the image brightness adjuster; and
a tone correcting parameter changer which changes a tone correcting parameter used in the image brightness adjusting processing;
wherein the image brightness adjuster executes the image brightness adjusting processing such that the entire summation image is gradually brightened as a number of the synthesized image frames is increased before the tone correcting parameter is changed by the tone correcting parameter changer, and executes the image brightness adjusting processing such that only a dark portion in the summation image is gradually brightened as the number of the synthesized image frames is increased after the tone correcting parameter is changed by the tone correcting parameter changer.

2. The image synthesizing apparatus according to claim 1, wherein the display renews the displayed summation image whenever a predetermined number of image frames are synthesized.

3. The image synthesizing apparatus according to claim 1, wherein, when the number of the synthesized image frames synthesized by the image synthesizer reaches a predetermined number after the tone correcting parameter changer changes the tone correcting parameter, the tone correcting parameter changer further changes the tone correcting parameter into a tone correcting parameter by which the brightness of the summation image becomes substantially constant even when the number of the synthesized image frames is increased.

4. An image synthesizing apparatus, comprising:
an image frames memory which stores a plurality of image frames which are produced by continuously taking pictures of a subject;
an image synthesizer which synthesizes the plurality of image frames to a summation image;
an image brightness adjuster which adjusts a brightness of the summation image by synthesizing the image frames with the image synthesizer;
a display which displays the summation image which is being synthesized by the image synthesizer in image brightness adjusting processing by the image brightness adjuster; and
a tone correcting parameter changer which changes a tone correcting parameter used in the image brightness adjusting processing;
wherein the image brightness adjuster executes the image brightness adjusting processing such that the entire summation image is gradually brightened as a number of the synthesized image frames is increased before the tone correcting parameter is changed by the tone correcting parameter changer, and executes noise reducing processing for reducing noise of the summation image as the number of the synthesized image frames is increased after the tone correcting parameter is changed by the tone correcting parameter changer.

* * * * *